R. CAUDRON.
CONNECTION OF FUEL TANKS WITH THEIR ENGINES.
APPLICATION FILED AUG. 9, 1918.
1,333,538.
Patented Mar. 9, 1920.
2 SHEETS—SHEET 1.
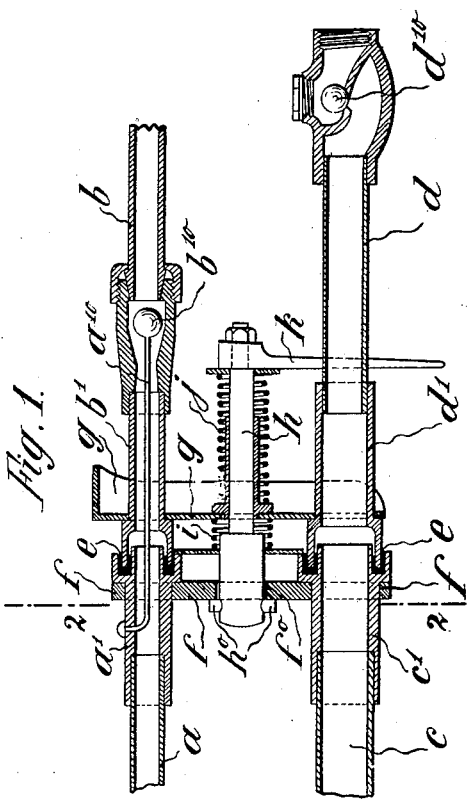

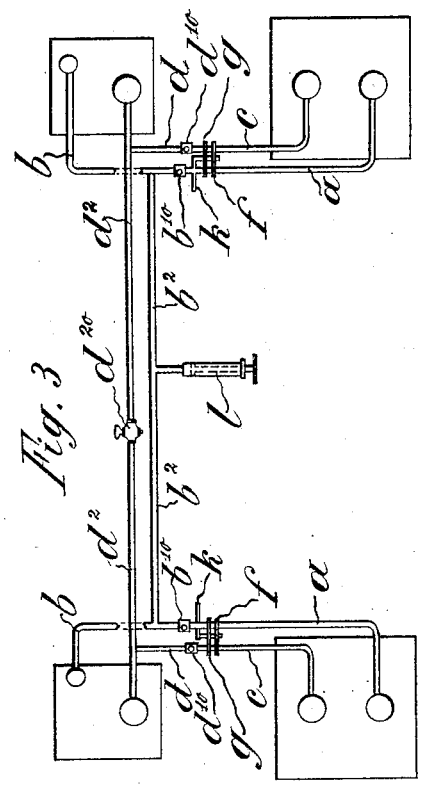

UNITED STATES PATENT OFFICE.

RENÉ CAUDRON, OF ISSY-LES-MOULINEAUX, FRANCE.

CONNECTION OF FUEL-TANKS WITH THEIR ENGINES.

1,333,538.  Specification of Letters Patent.  Patented Mar. 9, 1920.

Application filed August 9, 1918. Serial No. 249,215.

*To all whom it may concern:*

Be it known that I, RENÉ CAUDRON, manufacturer, citizen of the French Republic, residing at Issy-les-Moulineaux, Department of Seine, France, have invented certain new and useful Improvements in the Connection of Fuel-Tanks with Their Engines, of which the following is a specification.

This invention relates to an arrangement for connecting one or a plurality of reservoirs or fuel tanks with the engine or other apparatus and it concerns more particularly a detachable connection to be utilized aboard flying machines.

It has for its object to enable the connection of a fuel tank or tanks to be arranged in such manner that if for any reason a tank is to be cut out of action, for example if it is set on fire, it may be instantly detached and liberated so as to be dropped overboard without detriment to the machine.

To this end this invention consists generally speaking, in connecting or grouping the junctions or feed pipes leading from the fuel tank and the corresponding ends or pipes to be attached thereto by means of a contrivance comprising on the one hand two members, one integral with the terminals of the said feed pipes or their sockets, and the other integral with the corresponding terminals or sockets of the pipes to be attached thereto, and on the other hand a device adapted in one position to cause the two members to approach one another and thereby to establish and lock the connection between the corresponding pipes and in another position to separate the two members and, consequently, to disconnect the terminals of the said pipes, as will be more clearly understood from the accompanying drawings, showing, by way of example, a constructional form of the invention as applied more particularly to aeroplanes.

Figures 1 and 2 of this drawing show respectively in vertical section and in transverse section on the line 2—2 of Fig. 1 a connection constructed according to this invention.

Fig. 3 shows in plan view diagrammatically an installation for feeding the engines of a bimotor flying machine with carbureted air, utilizing a connection according to this invention.

As shown, the fuel tank is provided with a feed pipe $a$ to be attached to the pipe $b$ for the admission of compressed air, and with a feed pipe $c$ to be attached to the pipe $d$ leading to the carbureter. These feed pipes $a$ and $c$ are arranged parallel and at a short distance one from the other.

The extremities of the pipes $b$ and $d$ which are to be connected to the ends of the said feed pipes, are likewise parallel one with the other and at the same distance one from the other as the ends of the said feed pipes.

Secured by preference to the end of each feed pipe $a$ and $c$ is a gland $a'$, $c'$, respectively, each having its outer end formed with a female connecting element. Arranged on the extremity of each pipe $b$ and $d$, respectively, is a gland $b'$, $d'$, each terminating in a male member. Inserted in the female portion of each joint is a plastic substance $e$ adapted to render the joint air-tight when the opposite members thereof are in engagement one with the other.

The two glands $a'$ and $c'$ are fitted each in an opening arranged for this purpose in a plate $f$ which is soldered to the glands and serves to maintain the proper distance between them. Arranged in this plate $f$, moreover, preferably midway between the two glands, is a circular opening $f^0$ with diametrally opposed extensions or slots $f^{10}$.

The two glands $b'$ and $d'$ are likewise fitted each in an opening arranged for this purpose in a member $g$ which is integral with the body of the aeroplane and which is rigidly connected to the said sockets. Provided in this member $g$, moreover, coaxially with the opening $f^0$ in the plate $f$ is a central opening fitted in which with slight friction is a cylindrical rod $h$, provided with an enlarged head adapted to move with slight friction in the opening $f^0$ of the member $f$. Arranged on this head are radial projections $h^0$ capable of engaging with the notches $f^{10}$ in the member $f$.

Arranged on the rod $h$ and supported between the member $g$ and a fixed washer or plate bearing on the female gland portions is a coil spring $i$, and on the opposite side is a coil spring $j$, one end of which is supported against the member $g$ and the other end of which bears against a circular washer secured on the rod $h$, which at this end carries a hand lever $k$.

As will be seen, when the lever $k$ is brought into a position such, that the lugs $h^0$ register with the notches $f^{10}$, and pressure is then exerted by which the spring $i$ between the plates $f$ and $g$ is compressed, the lugs $h^0$ are caused to pass through the notches $f^{10}$ and then by rotating the lever $k$ and, consequently, the lugs $h^0$, the connecting device is locked, insuring the connection of the piping, while the tight fit of the joint is maintained by the pressure exercised by the spring $j$. When thereafter the lever $k$ is swung around to cause the lugs $h^0$ to register with the notches $f^{10}$, and released the disengagement of the parts will be immediate, because the spring $i$ forces the plates $f$ and $g$ apart. These manipulations are greatly facilitated by the provision on the outer faces of the notches $f^{10}$ of helicoidal surfaces, so that the rotation of the lever $k$ in the locking or releasing sense causes the projections $h^0$ to be screwed up with or unscrewed from the said notches respectively.

In fact, in locking the parts by acting on the lever $k$, the projections $h^0$ ride up the helicoidal faces, thereby insuring the compression of the spring $j$ and, consequently, the tightening up of the joints.

By means of this arrangement, if the fuel tank of the engine is set on fire, the pilot is able instantly to disconnect it from the air pump and from the engine and drop it overboard.

Where the aeroplane carries an auxiliary fuel tank or is provided with several engines each supplied from its individual fuel tank, the arrangement may be such that if one of the tanks is dropped overboard, the engine may still be supplied either from the auxiliary reservoir, or from the reservoir of the other engine.

To this end it is advisable when the feed pipes $a$ and $c$ are disconnected from the pipes $b$ and $d$, to cause the latter automatically to be closed in order to prevent the compressed air and the fuel from escaping therethrough. To this end a valve, for example a ball valve $b^{10}$, is arranged inside the end or socket of the pipe $b$, tending to close under the action of the compressed air flowing through this pipe toward the tank, and in the corresponding end or socket $a'$ of the pipe $a$ is secured a rod $a^{10}$, so that when the pipe $b$ is connected to the pipe $a$ the rod $a^{10}$ is caused to hold the ball valve $b^{10}$ away from its seat, as shown in Fig. 1. For the same purpose the pipe end $d$ is provided with a ball valve $d^{10}$ adapted to be opened only by the action exerted thereon by the fuel under pressure admitted from the pipe $c$ and counteracting any return of the fuel from the pipe $d$ into the tank. In the case of twin engines the two pipes $d$, as shown in Fig. 3, which connect the fuel tanks to the carbureters of their engines, are connected by a pipe $d^2$, and the latter is by preference provided with a valve $d^{20}$ adapted either to establish communication between the two engines or to interrupt any relation between them, if desired.

It will be seen that if one of the tanks be alight, it suffices to actuate the lever $k$ in order to sever its connection from the respective engine when the valves $b^{10}$ and $d^{10}$ are automatically closed, after which it is sufficient to open the valve $d^{20}$ in order to enable the tank of the other engine to feed the engine which has been deprived of its feed tank.

Moreover, in the twin arrangement it is advantageous to connect also the pipes $b$ by a conduit $b^2$ enabling the air in the two tanks to be compressed by means of a common pump $l$, as soon as the engine is started; this connection may be utilized in the case of a stoppage of one of the air pumps.

As will be readily understood, this invention is not to be held limited to the specific construction hereinbefore described with reference to the drawings but is intended to cover all such modifications as will be obvious to those skilled in the art, without departing from the spirit thereof.

Having now particularly described and ascertained the nature of my said invention and in what manner the same is to be performed, I declare that what I claim is:—

1. In a coupling for connecting a fuel tank to an engine, sleeve members adapted to be secured to the feed pipes of a fuel tank, a plate rigidly connected to and surrounding said sleeve members, said plate being formed with a relatively central aperture including radial recesses, coupling tubes adapted to be connected to the feed pipes of an engine, a relatively stationary plate surrounding said coupling tubes, said plate being formed with an aperture between said coupling tubes, a locking rod adapted to project through the apertures in said plates, said rod being provided at one end with radial projections adapted to pass through the recesses in the first-named plate, and means for turning said rod to secure said sleeve members and said coupling tubes in connected relation.

2. An arrangement as claimed in claim 1 wherein the rod adapted to connect the two plates is under the influence of a spring tending to disengage it from the plate secured to the feed pipe sleeves.

3. An arrangement as claimed in claim 1 having a spring interposed between the two plates or members tending to force the latter one from the other.

4. An arrangement as claimed in claim 1 in which the plate connected to the sleeve members has one of its faces formed with helicoidal inclines adapted to guide the locking projections of the rod as the latter is actuated.

5. An arrangement as claimed in claim 1 in which one of the sleeves is provided with a stem adapted, in the connected position of the parts, to open a valve arranged in the corresponding pipe connection and in disconnected position to be closed by the action of the fluid pressure.

6. An arrangement as claimed in claim 1 in which the feed pipe leading from the fuel tank to the carbureter is provided with a non-return valve.

7. An arrangement as claimed in claim 1 for two separate fuel tanks of which one becomes disabled, having the feed pipes of the separate tanks connected between them and so controlled by a valve or the like as to enable the engine or engines to be fed from the remaining tank.

In testimony whereof I have hereunto set my hand in presence of two subscribing witnesses.

RENÉ CAUDRON.

Witnesses:
JOHN F. SIMONS,
PAUL BLUM.